United States Patent
Yamamoto et al.

(10) Patent No.: US 7,670,706 B2
(45) Date of Patent: Mar. 2, 2010

(54) FUEL CARTRIDGE FOR FUEL CELL, AND FUEL CELL

(75) Inventors: Taisuke Yamamoto, Nara (JP); Junji Niikura, Osaka (JP); Nobuhiko Hojo, Osaka (JP)

(73) Assignee: Panasonic Corporation, Osaka (JP)

( * ) Notice: Subject to any disclaimer, the term of this patent is extended or adjusted under 35 U.S.C. 154(b) by 755 days.

(21) Appl. No.: 10/597,459

(22) PCT Filed: Feb. 16, 2005

(86) PCT No.: PCT/JP2005/002295

§ 371 (c)(1),
(2), (4) Date: Jul. 26, 2006

(87) PCT Pub. No.: WO2005/101558

PCT Pub. Date: Oct. 27, 2005

(65) Prior Publication Data

US 2009/0110999 A1    Apr. 30, 2009

(30) Foreign Application Priority Data

Apr. 7, 2004  (JP) ............... 2004-113397

(51) Int. Cl.
  *H01M 2/00*  (2006.01)
  *H01M 2/02*  (2006.01)
(52) U.S. Cl. ............... 429/34; 220/260; 220/262; 220/284
(58) Field of Classification Search .......... 222/1, 222/153.01, 153.03, 153.11, 165, 81, 142.5, 222/142.2; 429/9, 12, 13, 22, 23, 24, 34, 429/35, 96, 97, 100; 210/429, 430, 435, 210/441, 502.1, 510.1; 220/582, 583
See application file for complete search history.

(56) References Cited

U.S. PATENT DOCUMENTS

| 3,509,892 | A | * | 5/1970 | Macek ............... 137/9 |
| 6,460,733 | B2 | | 10/2002 | Acker et al. |
| 2003/0136453 | A1 | | 7/2003 | Johnson |
| 2003/0207158 | A1 | | 11/2003 | Bullock et al. |

FOREIGN PATENT DOCUMENTS

| CN | 2 467 093 | | 5/2003 |
| EP | 1 313 160 | | 5/2003 |
| JP | 2002-270210 | | 9/2002 |
| JP | 2002-372231 | * | 12/2002 |
| JP | 2003-217618 | | 7/2003 |
| JP | 2003-331879 | | 11/2003 |
| JP | 2004-93409 | | 3/2004 |

* cited by examiner

*Primary Examiner*—Jerry Lorengo
*Assistant Examiner*—Heng M Chan
(74) *Attorney, Agent, or Firm*—Hamre, Schumann, Mueller & Larson, P.C.

(57) ABSTRACT

A fuel cartridge (1) includes a fuel storage container (2), and a fuel supply port (4) for taking out a fuel stored in the fuel storage container (2). The fuel supply port (4) is provided with a fuel supply port protecting mechanism. The fuel supply port protecting mechanism includes a door (10) for opening/closing an opening (11) provided between the fuel supply port (4) and an outside, and a lock mechanism (20) for locking the door (10) so that the door (10) does not open. This can prevent, with the fuel cartridge not installed on a fuel cell, the leakage of a fuel from the fuel cartridge caused by improper handling by a user, etc.

6 Claims, 12 Drawing Sheets

FUEL CARTRIDGE FOR FUEL CELL, AND FUEL CELL

TECHNICAL FIELD

The present invention relates to a fuel cartridge for a fuel cell having at least a fuel storage container and a fuel supply port. The present invention also relates to a fuel cell that has or is adapted for the fuel cartridge.

BACKGROUND ART

Currently, a lithium ion secondary battery mainly is used as a power source of mobile equipment such as a mobile telephone and a notebook computer. However, the further increase in the capacity of the lithium ion secondary battery is reaching a limit, and a small fuel cell is drawing attention as an energy device capable of realizing the further increase in capacity.

As the small fuel cell, various types of systems have been designed. Among them, a direct methanol type fuel cell (DMFC) is considered to be most practical. The DMFC is a fuel cell capable of supplying methanol as a fuel directly to an electrode, and obtaining electricity when water and carbon dioxide are generated from methanol and oxygen. Due to the direct supply of methanol as a fuel, a fuel reformer and other auxiliary appliances can be substantially omitted, so that a very high energy density is expected.

However, regarding the mobile equipment, an equipment body or a fuel storage container may be damaged due to dropping or the like. Particularly, in the case of dropping the fuel storage container, there is a possibility that a fuel may leak out due to the damage of a fuel supply port.

Furthermore, there is a possibility that the following accidents may occur: a user removes a contained fuel through the fuel supply port mischievously or intentionally, drinks the fuel by mistake, inhales a great amount of vapor thereof, and the like. Particularly, in the case where a fuel is harmful to a human body or is inflammable, some system for preventing the above-mentioned situations is required in the fuel storage container.

FIG. 12 shows an exemplary configuration of a conventional fuel cartridge for a fuel cell. A fuel cartridge 1 includes a fuel storage container 2 for storing a fuel, a fuel supply port 4 for supplying the fuel to equipment, and a fuel supply valve (check valve) 3 provided at the fuel supply port 4 so as to enable the fuel to be supplied only when the fuel is supposed to be supplied (e.g., see JP 2002-270210 A).

Furthermore, a fuel cartridge for a fuel cell has been proposed, which has a fuel storage container, a fuel supply port for supplying a fuel, a fuel supply valve enabling a fuel to be supplied, and a back pressure regulator for setting the internal pressure of the fuel storage container to be lower than an external pressure when the fuel is not supplied (see JP 2003-217618 A). The back pressure regulator sets the pressure in the fuel storage container to be always lower than the pressure outside the fuel cartridge, thereby preventing the internal pressure from increasing due to the vaporization of a liquid fuel in the fuel storage container to cause the leakage of the fuel.

As a method for supplying a fuel in a fuel cartridge to a fuel cell, a method for supplying a fuel by allowing a hollow needle provided at the fuel cell to pass through a partition wall provided at a fuel supply port of the fuel cartridge has been proposed (e.g., see U.S. Patent Application Publication No. 2003/0207158 A1, U.S. Pat. No. 6,460,733 B2).

DISCLOSURE OF INVENTION

Problem to be Solved by the Invention

However, in the above-mentioned conventional fuel cartridge, when impact is applied to the fuel supply port, or a human hand comes into direct contact with the fuel supply port intentionally or carelessly, when the fuel cartridge is not connected to equipment or is being connected thereto, the fuel supply port may be damaged or opened to cause the leakage of a stored fuel.

The object of the present invention is to provide a fuel cartridge and a fuel cell, which reduce, with the fuel cartridge not installed on the fuel cell, the possibility of the leakage of a fuel caused by dropping of the fuel cartridge or impact on a fuel supply port, or caused intentionally or accidentally during replacement or attachment of the fuel cartridge by a user, during storage, or the like.

Means for Solving Problem

A first fuel cartridge for a fuel cell of the present invention includes a fuel storage container and a fuel supply port for taking out a fuel stored in the fuel storage container, wherein a fuel supply port protecting mechanism is provided at the fuel supply port, and the fuel supply port protecting mechanism includes a door for opening/closing an opening provided between the fuel supply port and an outside, and a lock mechanism for locking the door so that the door does not open.

A second fuel cartridge for a fuel cell of the present invention includes a fuel storage container and a fuel supply port for taking out a fuel stored in the fuel storage container, wherein a fuel supply port protecting mechanism is provided at the fuel supply port, and the fuel supply port protecting mechanism includes a plurality of valves provided on a fuel passage connecting the fuel storage container to the fuel supply port.

Furthermore, a fuel cell of the present invention includes an insertion port in which a fuel cartridge is inserted, the fuel cartridge having a door for opening/closing an opening provided between a fuel supply port for taking out a fuel stored in a fuel storage container and an outside, and a lock mechanism for locking the door so that the door does not open, wherein the insertion port includes a lock cancel system for canceling a lock by the lock mechanism, and a driving portion for performing an opening operation of the door.

Furthermore, another fuel cell of the present invention includes an insertion port in which a fuel cartridge is inserted, the fuel cartridge having a plurality of valves provided on a fuel passage connecting a fuel storage container to a fuel supply port for taking out a fuel stored in the fuel storage container, wherein the insertion port includes a driving portion for opening the plurality of valves simultaneously.

EFFECTS OF THE INVENTION

The present invention can prevent, with a fuel cartridge not installed on a fuel cell, the leakage of a fuel from a fuel cartridge, for example, caused by the damage of a fuel supply port ascribed to dropping or the like or caused by the careless handling or intentional operation by a user.

DESCRIPTION OF THE INVENTION

Figure 1:
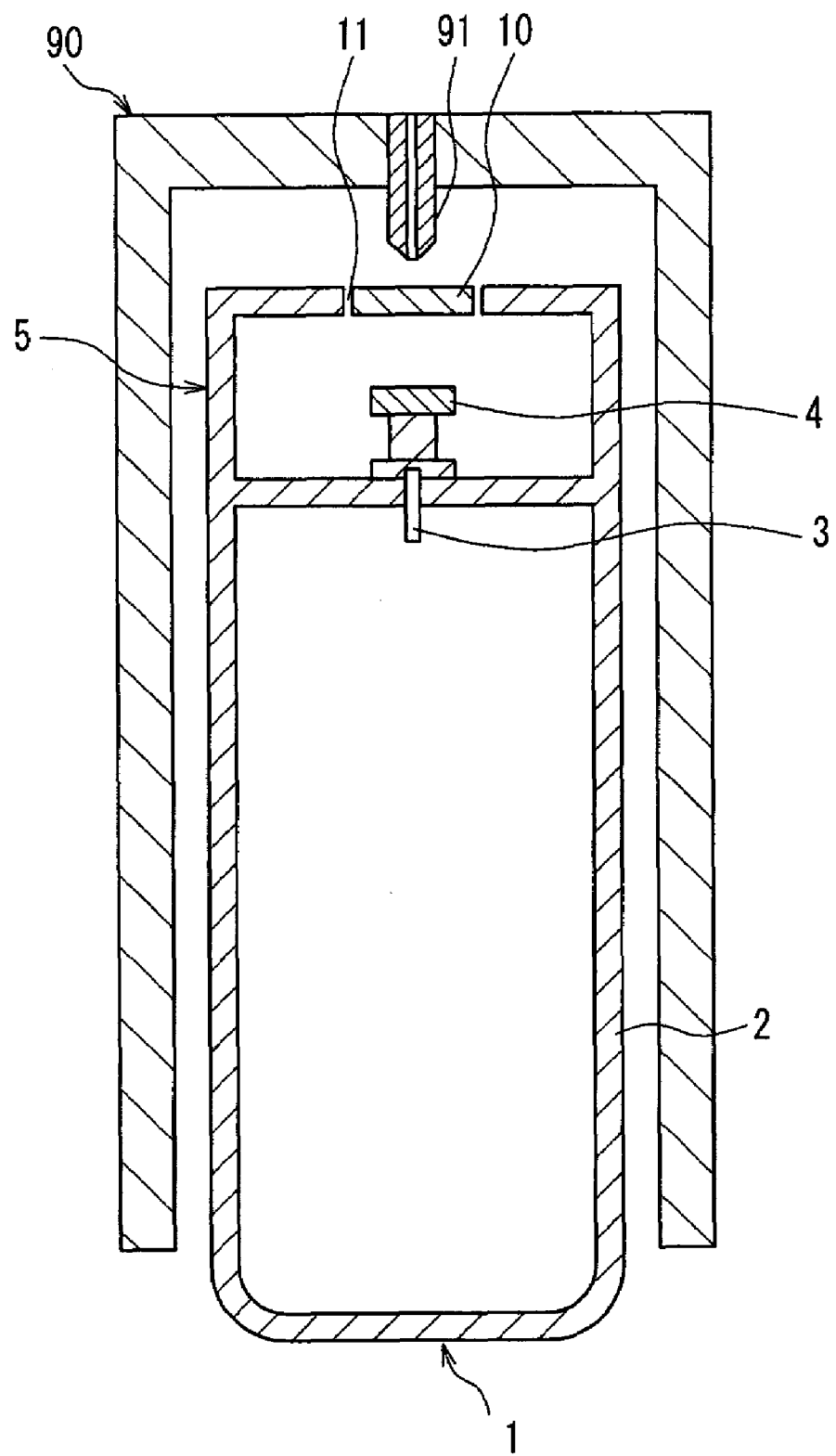
FIG. 1 is a cross-sectional view showing an exemplary basic configuration of a fuel cartridge for a fuel cell of the present invention.

A fuel cell of the present invention has a configuration in which a negative electrode and a positive electrode sandwiching an electrolyte film therebetween are accommodated in a container. A fuel such as hydrocarbon containing oxygen is supplied to the negative electrode. This fuel is accommodated in a fuel storage container of a fuel cartridge. By installing the fuel cartridge in an insertion port provided at the fuel cell, the fuel can be supplied. For example, the fuel cell is built in mobile equipment or the like, and the fuel cartridge is connected attachably/detachably to the fuel cell. When the fuel in the fuel cartridge is exhausted, the fuel cartridge is replaced with a new fuel cartridge.

In the fuel cartridge for a fuel cell of the present invention, a fuel supply port protecting mechanism is provided at the fuel supply port. This can prevent the fuel in the fuel cartridge from leaking unexpectedly or being taken out, even upon dropping the fuel cartridge, the unexpected operation or unintentional operation by a user, the intentional operation by the user, or the like.

In a first fuel cartridge for a fuel cell of the present invention, the fuel supply port protecting mechanism includes a door for opening/closing an opening provided between the fuel supply port and the outside, and a lock mechanism for locking the door so that the door does not open. This can realize the fuel supply port protecting mechanism with a simple configuration. Furthermore, since the opening and the door for closing the opening are provided between the fuel supply port and the outside, even if the fuel cartridge is dropped, a physical external force is not applied to the fuel supply port, and the fuel supply port, which is considered to be relatively weak in terms of structure, can be protected, whereby the leakage of a fuel caused by the breakage of the fuel supply port can be prevented. Furthermore, a user can be prevented from touching the fuel supply port intentionally or carelessly to cause the leakage of a fuel.

It is preferable that physical access to the fuel supply port is not allowed unless a lock by the lock mechanism is cancelled and the door is opened. This can prevent more securely, with the fuel cartridge not installed on a fuel cell, the leakage of a fuel from the fuel supply port caused by handling by a user.

It is preferable that the fuel supply port protecting mechanism further includes a mechanism capable of confirming that a lock by the lock mechanism is cancelled. This makes it possible to confirm easily, for example, whether the fuel cartridge has been used or not.

In a second fuel cartridge for a fuel cell of the present invention, the fuel supply port protecting mechanism includes a plurality of valves provided on a fuel passage connecting the fuel storage container to the fuel supply port. This can realize the fuel supply port protecting mechanism with a simple configuration. Furthermore, even if the fuel cartridge is dropped, and only a part of the plurality of valves is broken, the leakage of a fuel can be prevented by the remaining valves. Furthermore, a user can be prevented from allowing a fuel to leak from the fuel supply port intentionally or carelessly.

Next, a first fuel cell of the present invention includes the first fuel cartridge for a fuel cell of the present invention and an insertion port in which the fuel cartridge is inserted, wherein the insertion port includes a lock cancel system for canceling a lock by the lock mechanism, and a driving portion for performing an opening operation of the door.

A second fuel cell of the present invention includes the second fuel cartridge for a fuel cell of the present invention and an insertion port in which the fuel cartridge is inserted, wherein the insertion port includes a driving portion for opening the plurality of valves simultaneously.

A third fuel cell of the present invention includes an insertion port in which a fuel cartridge is inserted, the fuel cartridge having a door for opening/closing an opening provided between a fuel supply port for taking out a fuel stored in a fuel storage container and the outside, and a lock mechanism for locking the door so that the door does not open, wherein the insertion port includes a lock cancel system for canceling a lock by the lock mechanism, and a driving portion for performing an opening operation of the door.

A fourth fuel cell of the present invention includes an insertion port in which a fuel cartridge is inserted, the fuel cartridge having a plurality of valves provided on a fuel passage connecting a fuel storage container to a fuel supply port for taking out a fuel stored in the fuel storage container, wherein the insertion port includes a driving portion for opening the plurality of valves simultaneously.

According to the first to fourth fuel cells, with the fuel cartridge not installed on a fuel cell, the leakage of a fuel from the fuel cartridge can be prevented. On the other hand, merely by inserting the fuel cartridge in the insertion port of a fuel cell, a fuel can be supplied immediately and precisely to a negative electrode of the fuel cell.

FIG. 1 shows a basic configuration of the fuel cartridge for a fuel cell of the present invention. A fuel cartridge 1 of the present invention is attached/detached (inserted/extracted) with respect to a fuel cartridge insertion port (hereinafter, referred to as an "insertion port") 90 provided at a fuel cell built in mobile equipment or the like. In the insertion port 90, a fuel cell side fuel intake (hereinafter, referred to as a "fuel intake") 91 is provided.

The fuel cartridge 1 has a fuel storage container 2 accommodating a fuel, a fuel supply port 4 that is to be connected to the fuel intake 91 to supply the fuel to the fuel cell, and a fuel supply valve (check valve) 3 that is operated only when required so as to supply the fuel.

The fuel storage container 2 is configured in such a manner as to hold an alcohol-based tel such as methanol or an ether-based tel such as dimethyl ether for a long period of time, and generally is composed of a material that is inactive with respect to the fuel. Although the fuel storage container 2 has a substantially square columnar shape in FIG. 1, it may have a cylindrical shape, and hence, the shape thereof is not limited.

The fuel cartridge according to one embodiment of the present invention includes a fuel supply port protecting mechanism 5 for protecting the fuel supply port 4, and disabling the physical access to the fuel supply port 4 except when it is required (e.g., when a fuel is supplied to the fuel cell). The fuel supply port protecting mechanism 5 includes a door 10 that is opened/closed in synchronization with the attachment/detachment operation of the fuel cartridge 1 with respect to the insertion port 90, and a lock mechanism (described later in detail) for locking the door 10 so that the door 10 does not open when the fuel cartridge 1 is not inserted in the insertion port 90. More specifically, in order to open the door 10, it is necessary to cancel a lock by the lock mechanism, and provide an external force so as to open the door 10.

It is preferable that the canceling of a lock by the lock mechanism and the opening operation of the door 10 are performed mechanically in synchronization with the operation of inserting the fuel cartridge 1 in the insertion port 90. According to this configuration, when the fuel cartridge 1 is inserted in the insertion port 90, the lock mechanism is cancelled automatically, and then, the fuel supply port 4 appears in an opening 11 formed when the door 10 is opened. When the fuel cartridge 1 has been pushed in to the end of the insertion port 90, the fuel supply port 4 and the fuel intake 91 are connected to each other. Consequently, the fuel supply valve 3 is opened, whereby the fuel in the fuel storage container 2 can be supplied to the fuel cell.

Although there is no particular limit to the material for the fuel supply port protecting mechanism 5, it is desirable that the fuel supply port protecting mechanism 5 is made of resin or metal having high mechanical strength, which is not damaged by impact such as dropping, and cannot be decomposed or broken easily by a user.

There is no particular limit to the shape and connection system of the fuel supply port 4 on the fuel cartridge 1 side and the fuel intake 91, and for example, they may have a coupling mechanism composed of a mechanical element, a seal member, or the like, a coupling mechanism having a simpler valve mechanism, or a configuration in which the fuel intake 91 in a hollow needle shape pierces the fuel supply port 4 made of an elastic body to supply a fuel.

There is no particular limit to a method for inserting the fuel cartridge 1 in the insertion port 90, and a method for automatically inserting the fuel cartridge 1 by an electrical mechanism, a method for inserting the fuel cartridge 1 by the application of a user's physical force, and the like can be adopted.

The insertion port 90 may be provided with a mechanism (e.g., a rail) guiding the fuel cartridge 1 in a predetermined direction. This enables the fuel cartridge 1 to be inserted smoothly. Furthermore, this can prevent the insertion in a wrong orientation.

Hereinafter, more specific embodiments of the present invention will be described in detail with reference to the drawings.

Embodiment 1

Figure 2A:
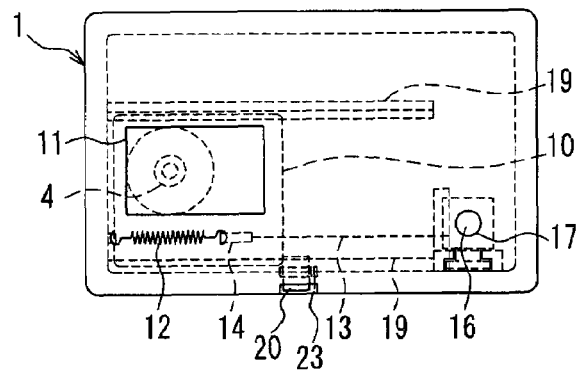
FIG. 2A is a plan view of the fuel cartridge according to Embodiment 1 of the present invention.
Figure 2B:
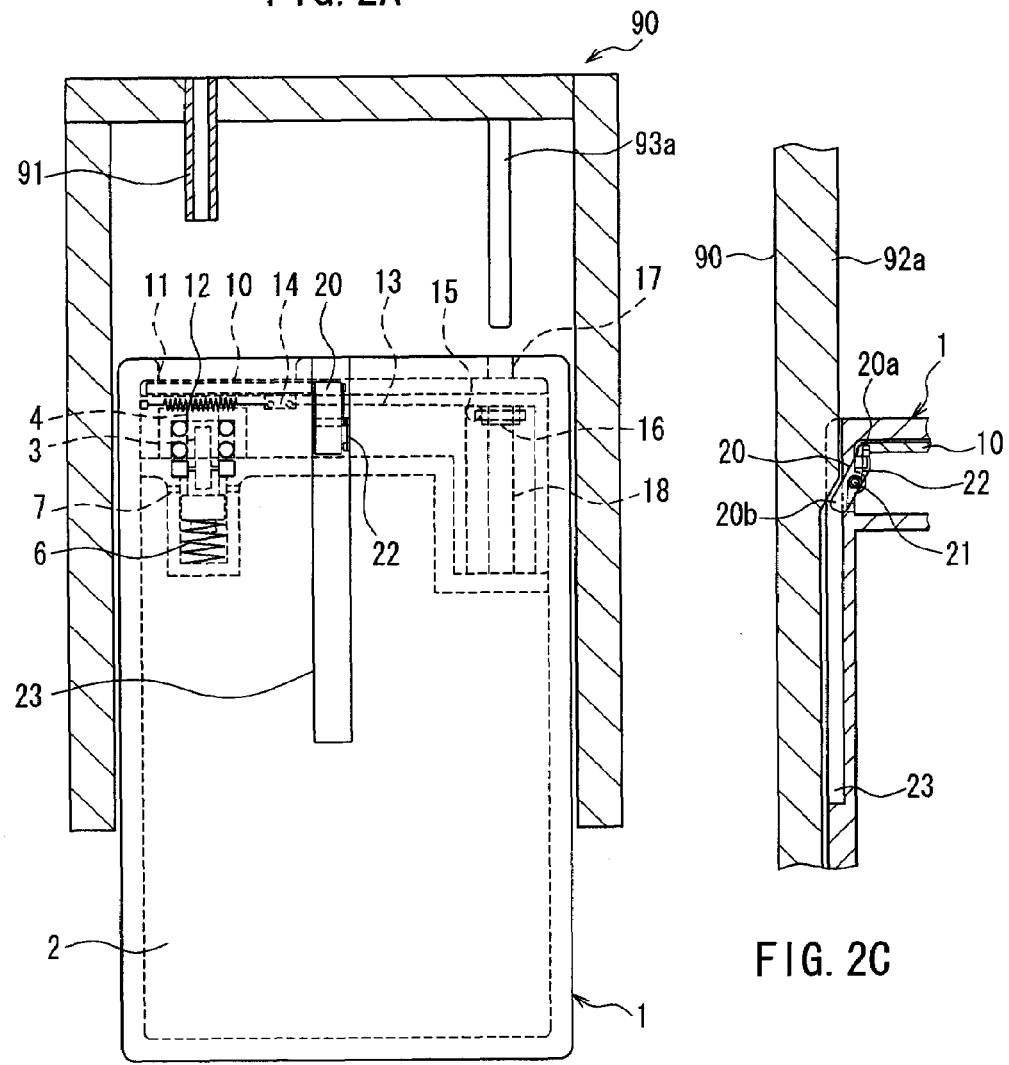
FIG. 2B is a front cross-sectional view showing one process in which the fuel cartridge according to Embodiment 1 of the present invention is inserted in a fuel cartridge insertion port.
Figure 2C:
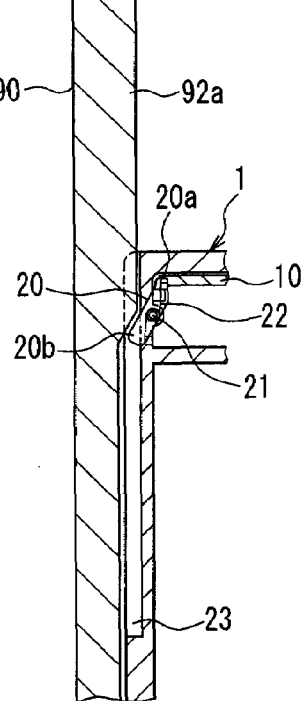
FIG. 2C is a cross-sectional view illustrating a cancel operation of a lock mechanism provided in the fuel cartridge according to Embodiment 1 of the present invention.
Figure 5A:
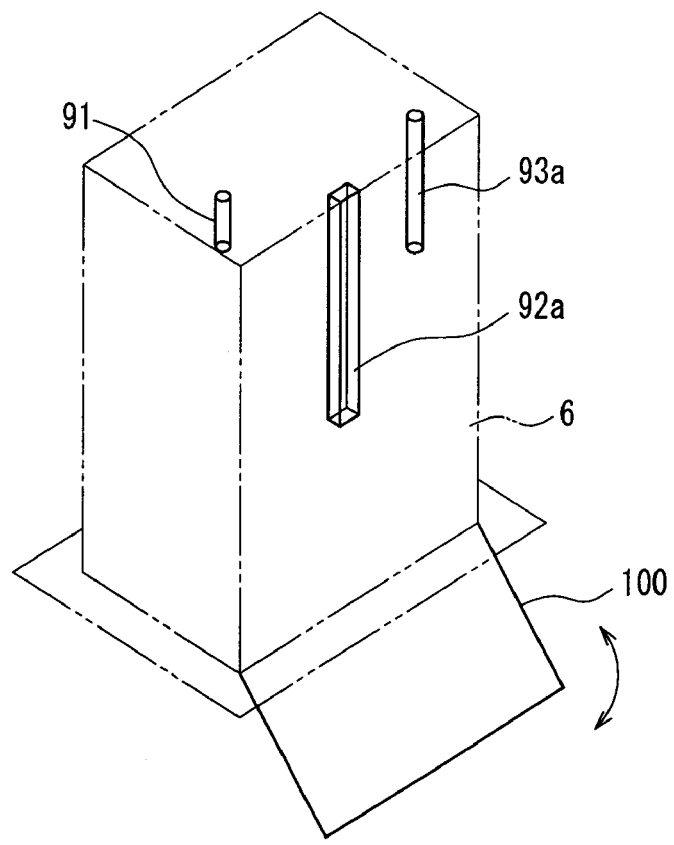
FIG. 5A is a perspective view showing members provided inside the fuel cartridge insertion port, corresponding to the fuel cartridge according to Embodiment 1 of the present invention.
Figure 5B:
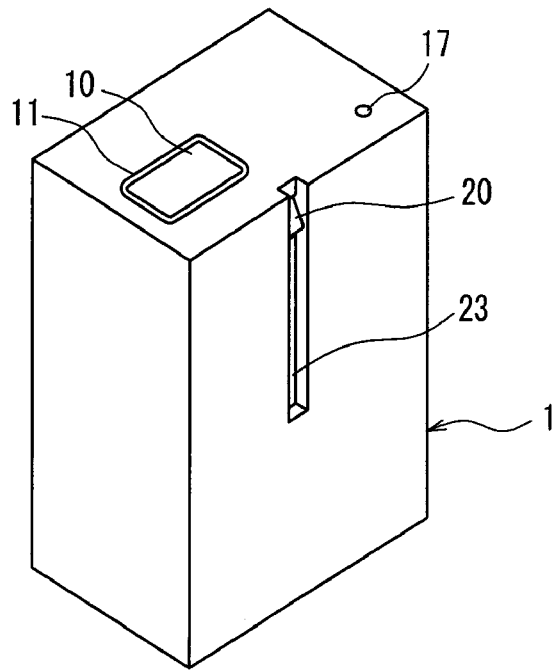
FIG. 5B is a perspective view showing an external appearance shape of the fuel cartridge according to Embodiment 1 of the present invention.

FIG. 2A is a plan view of a fuel cartridge 1 according to Embodiment 1 of the present invention; FIG. 2B is a cross-sectional view showing one process in which the fuel cartridge 1 according to Embodiment 1 is inserted in an insertion port 90; and FIG. 2C is a cross-sectional view illustrating a cancel operation of a lock mechanism provided in the fuel cartridge 1 according to Embodiment 1. Furthermore, FIG. 5A is a perspective view showing members provided inside the insertion port 90, corresponding to the fuel cartridge 1 according to Embodiment 1; and FIG. 5B is a perspective view showing an external appearance shape of the fuel cartridge 1 according to Embodiment 1.

A fuel supply valve 3 provided at a fuel supply port 4 can move in a vertical direction on the drawing surface of FIG. 2B. A compression coil spring 6 biases the fuel supply valve 3 in an upward direction on the drawing surface of FIG. 2B. The fuel supply port 4 and the fuel storage container 2 are connected to each other through a fuel passage 7. When the fuel supply valve 3 is moved in a downward direction against the biasing force of the compression coil spring 6, a fuel in the fuel storage container 2 of the fuel cartridge 1 can be taken out through the fuel passage 7 and the fuel supply port 4.

An opening 11 is provided on an upper surface of the fuel cartridge 1. A slide-type door 10 is guided by a linear rail 19 to move linearly in one direction, thereby opening/closing the opening 11. When the opening 11 is opened, the fuel supply port 4 is exposed in the opening 11. A tension spring 12 applies a biasing force to the door 10 so that the closed state of the door 10 is maintained. One end of the tension spring 12 is fixed to an inner wall surface of the fuel cartridge 1, and the other end thereof is connected to one end of a wire 13 via a connector 14. The wire 13 is guided by a pulley 15, and the other end of the wire 13 is connected to a knob 16. The connector 14 is connected to the door 10. A hole 17 is formed on the upper surface of the fuel cartridge 1. The knob 16 is exposed in the hole 17. A guide path 18 guides the knob 16 in the vertical direction on the drawing surface of FIG. 2B.

A swinging member 20 is held by the fuel cartridge 1 swingably in a range of about 30° with respect to a spindle 21. A torsion coil spring 22 biases the swinging member 20 in a clockwise direction in FIG. 2C. A groove 23 is provided on a side surface of the fuel cartridge 1 in parallel with the direction in which the fuel cartridge 1 is inserted in the insertion port 90. The swinging member 20 is attached to an upper end portion of the groove 23 so as to be fitted in the groove 23. When the swinging member 20 receives only a biasing force of the torsion coil spring 22, a lock hook 20a at one end of the swinging member 20 protrudes in a movement path of the door 10, and an operation end 20b at the other end protrudes from a bottom surface of the groove 23. In this state, the door 10 is locked with the lock hook 20a of the swinging member 20 so as not to move. More specifically, the swinging member 20 functions as a lock mechanism of the door 10.

A fuel intake 91 protrudes from an inner upper wall surface of the insertion port 90. A ridge-shaped convex portion 92a for canceling a lock is provided on an inner side surface of the insertion port 90. A rod 93a protrudes from the inner upper wall surface of the insertion port 90.

Next, the opening operation of the door 10 of the fuel cartridge 1 of Embodiment 1 configured as above will be described.

As shown in FIG. 2B, the fuel cartridge 1 is inserted in the insertion port 90. In the course of insertion, the ridge-shaped convex portion 92a formed on an inner wall surface of the insertion port 90 comes into contact with and presses the operation end 20b of the swinging member 20 provided at the fuel cartridge 1. This rotates the swinging member 20 in a counterclockwise direction in FIG. 2C against the biasing force of the torsion coil spring 22. Consequently, the lock hook 20a retracts out from the movement path of the door 10, whereby the lock of the door 10 is cancelled.

Figure 3A:
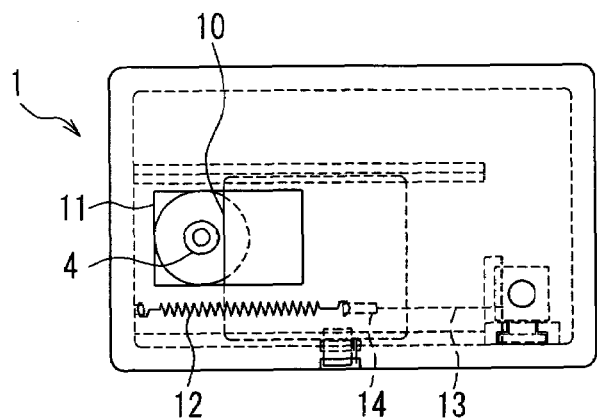
FIG. 3A is a plan view of the fuel cartridge according to Embodiment 1 of the present invention, which is being inserted in the fuel cartridge insertion port to open a door.
Figure 3B:
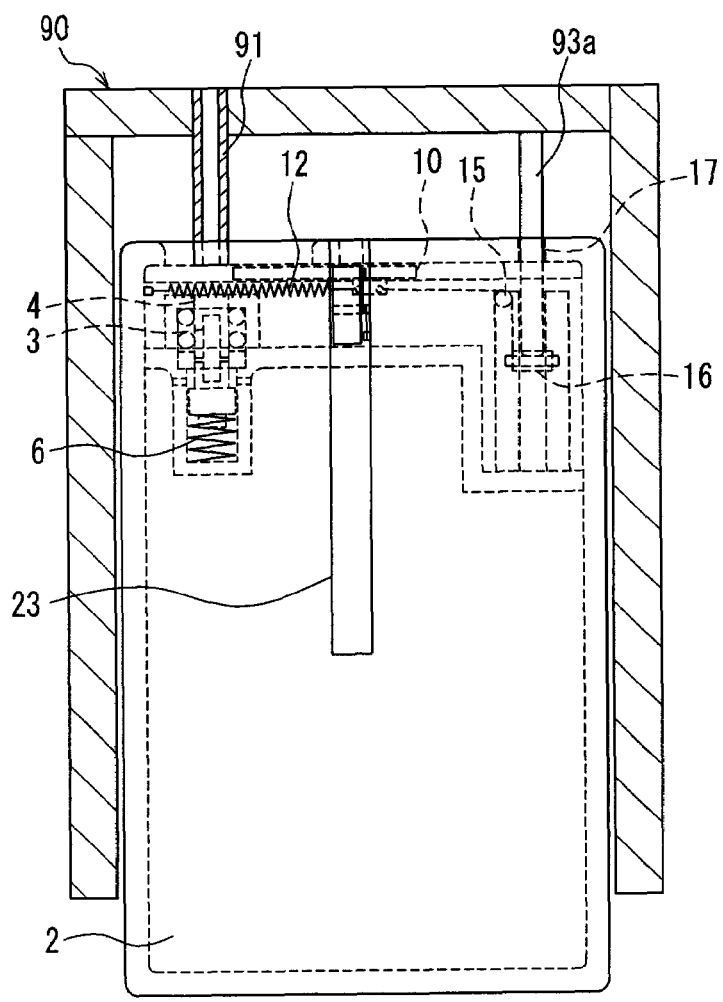
FIG. 3B is a front cross-sectional view showing a state in which the fuel cartridge according to Embodiment 1 of the present invention is being inserted in the fuel cartridge insertion port to open a door.

When the fuel cartridge 1 is inserted further, as shown in FIG. 3B, the rod 93a protruding from the inner wall surface of the insertion port 90 is inserted in the hole 17 provided on the upper surface of the fuel cartridge 1, thereby pushing down the knob 16. As the knob 16 is descending, the tension spring 12 connected to the knob 16 via the wire 13 extends, and the door 10 connected to the connector 14 moves. More specifically, the rod 93a, the knob 16, the wire 13, and the pulley 15 convert the displacement of the fuel cartridge 1 in the insertion direction into a linear movement of the door 10 in a direction orthogonal to the insertion direction. The opening 11 is opened along with the movement of the door 10, as shown in FIG. 3A.

When the fuel cartridge 1 is inserted further, the fuel intake 91 protruding from the inner wall surface of the insertion port 90 is inserted in the opening 11 of the fuel cartridge 1, and is inserted in the fuel supply port 4 exposed in the opening 11. The fuel supply port 4 is composed of the fuel supply valve 3, the compression coil spring 6, an O-ring, and the like. The fuel intake 91 pushes in the fuel supply valve 3 in the fuel supply port 4, and the fuel passage 7 connected to a side wall surface along which the fuel supply valve 3 slides and the fuel supply port 4 are communicated with each other.

Figure 4A:
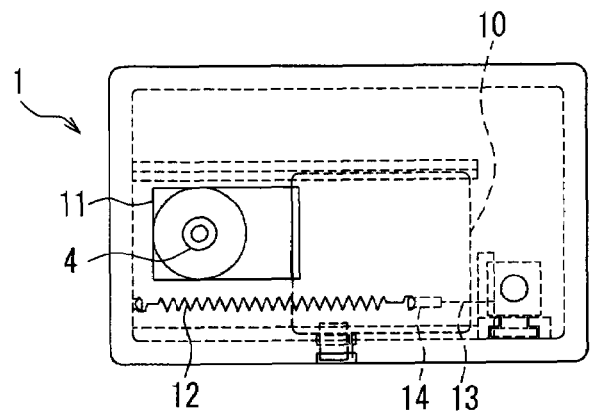
FIG. 4A is a plan view of a fuel cartridge according to Embodiment 1 of the present invention, which has been inserted to an end of the fuel cartridge insertion port to open a door completely.
Figure 4B:
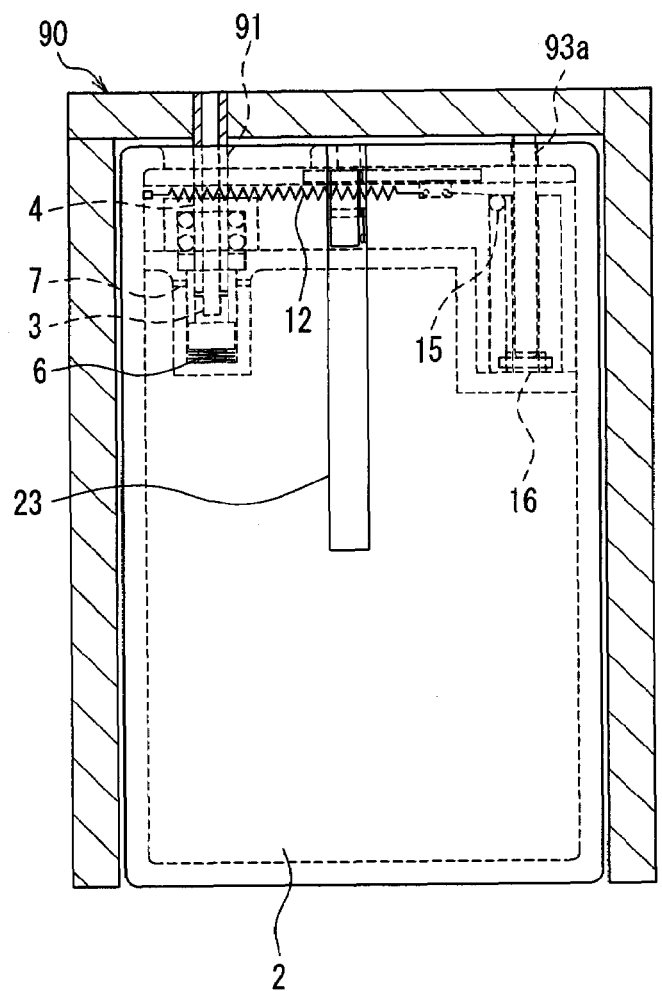
FIG. 4B is a front cross-sectional view showing a state in which the fuel cartridge according to Embodiment 1 of the present invention has been inserted to the end of the fuel cartridge insertion port to open the door completely.

When the fuel cartridge 1 has been inserted completely in the insertion port 90, the fuel in the fuel storage container 2 of the fuel cartridge 1 can be supplied to a fuel cell via the fuel passage 7, the fuel supply port 4, and the fuel intake 91 (FIGS. 4A and 4B).

In the case of pulling out the fuel cartridge 1 from the insertion port 90, the above-mentioned operation is performed in an opposite manner. More specifically, the fuel intake 91 is pulled out from the opening 11, and the fuel supply valve 3 is returned by an elastic restoring force of the compression coil spring 6 to close the fuel supply port 4. As the rod 93a is being pulled out from the hole 17, the door 10 moves by an elastic restoring force of the tension spring 12, whereby the opening 11 is closed gradually. Finally, the pressure force, which the swinging member 20 receives from the ridge-shaped convex portion 92a, is removed, whereby the swinging member 20 rotates by an elastic restoring force of the torsion coil spring 22 to set the lock of the door 10.

Thus, the fuel cartridge 1 of Embodiment 1 includes the door 10 covering the fuel supply port 4, and the swinging member 20 as a lock mechanism that prevents the door 10 from moving to open the opening 11 except when it is required. The fuel supply port protecting mechanism prevents, with the fuel cartridge 1 not inserted in the insertion port 90, the leakage of a stored fuel caused by the damage of the fuel supply port 4 or the opening of the fuel supply port 4.

By appropriately setting the width and depth of the groove 23 in which the swinging member 20 is placed, a user can be prevented from canceling a lock by operating the swinging member 20 with the finger or the like. Therefore, it is desirable that the width of the groove 23 is small, and the depth thereof is large. In one example, the width and the depth of the groove 23 were set to be 1.5 mm and 3 mm. With these dimensions, the user was not able to insert the finger in the groove 23, and was not able to cancel a lock without using a very thin bar. Thus, the user was not able to open the door 10 with the hand. In the above-mentioned figures, the swinging member 20 and the groove 23 are exaggerated for the ease of understanding the configuration.

By appropriately setting the thickness and length of the rod 93a used for opening/closing the door 10, and the size of the opening of the hole 17 corresponding to the rod 93a, the opening 11 can be designed so as not to open unless the fuel cartridge 1 is inserted in the insertion port 90. In one example, the rod 93a was formed in a cylindrical shape with a diameter of 1 mm and a length of 3 mm, and the hole 17 was formed in a circular opening with substantially the same diameter as that of the rod 93a. With these dimensions, even if the lock was able to be cancelled, the door 10 was not able to be opened with the finger, and the door 10 was not able to be opened without using a very thin bar.

A film may be placed so as to close the opening of the hole 17. Once the fuel cartridge 1 is inserted in the insertion port 90, the film is broken, so that the fuel cartridge easily can be confirmed to have been used by visual inspection. There is no particular limit to the material for the film closing the hole 17.

As shown in FIG. 5A, the insertion port 90 may be provided with a door 100 for fixing the inserted fuel cartridge 1. After the fuel cartridge 1 is inserted, the fuel cartridge 1 is maintained in the insertion port 90 against the biasing force of the compression coil spring 6 and the tension spring 12, by closing the door 100. The fuel cartridge 1 can be taken out by opening the door 100.

The rod 93a may be configured so as to be accommodated in the insertion port 90 when the fuel cartridge 1 has not been inserted, and so as to protrude in synchronization with the insertion of the fuel cartridge 1 in the insertion port 90.

Embodiment 2

Figure 6A:
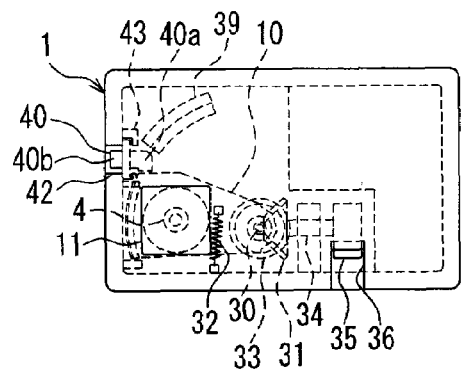
FIG. 6A is a plan view of a fuel cartridge according to Embodiment 2 of the present invention.
Figure 6B:
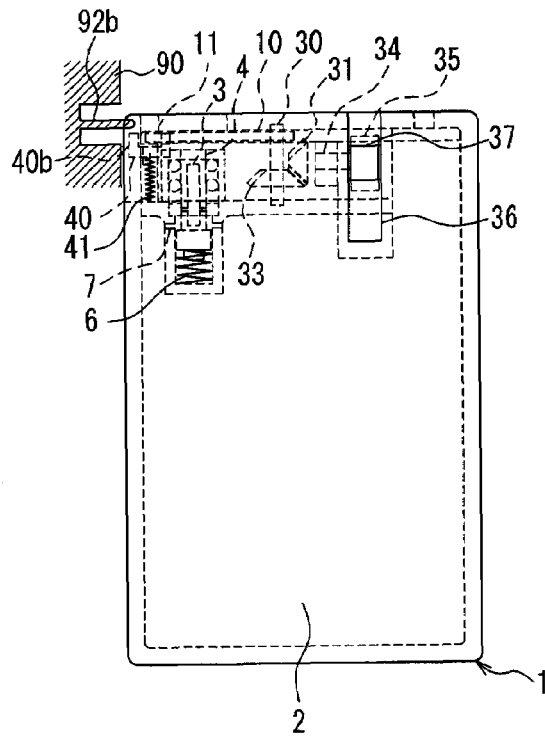
FIG. 6B is a front cross-sectional view showing one process in which the fuel cartridge according to Embodiment 2 of the present invention is inserted in a fuel cartridge insertion port.
Figure 6C:
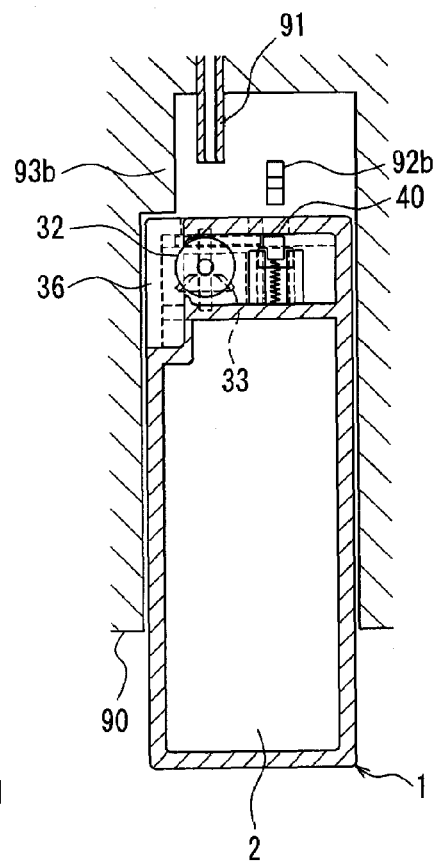
FIG. 6C is a side cross-sectional view thereof.
Figure 9A:
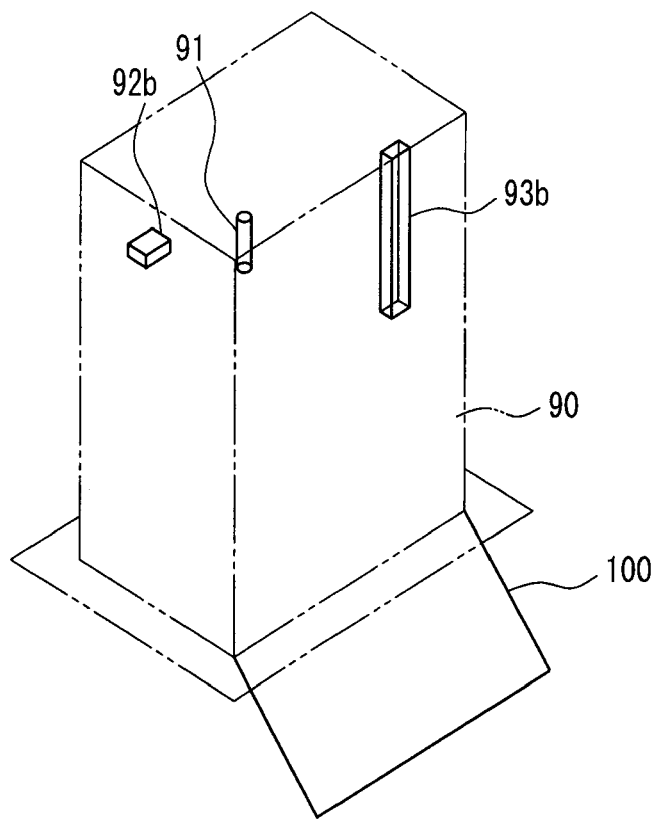
FIG. 9A is a perspective view showing members provided inside the fuel cartridge insertion port, corresponding to the fuel cartridge according to Embodiment 2 of the present invention.
Figure 9B:
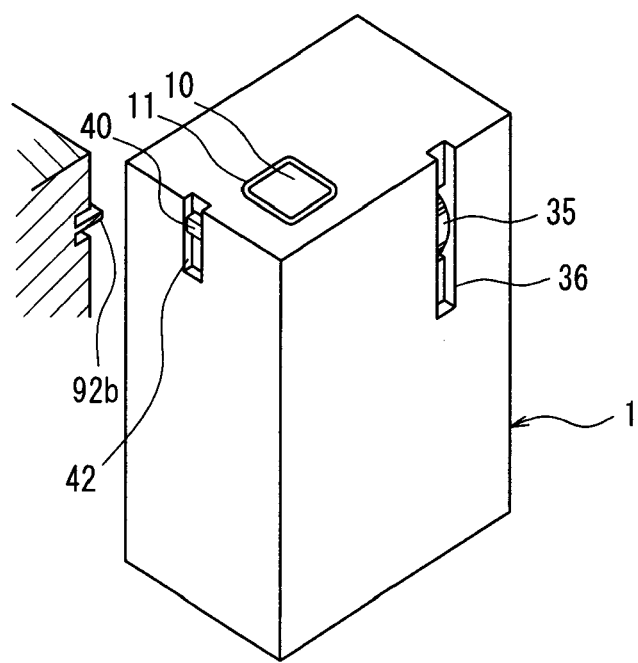
FIG. 9B is a perspective view showing an external appearance shape of the fuel cartridge according to Embodiment 2 of the present invention.

FIG. 6A is a plan view of a fuel cartridge 1 according to Embodiment 2 of the present invention; FIG. 6B is a front cross-sectional view showing one process in which the fuel cartridge 1 according to Embodiment 2 is inserted in an insertion port 90; and FIG. 6C is a side cross-sectional view thereof. FIG. 9A is a perspective view showing members provided inside the insertion port 90, corresponding to the fuel cartridge 1 according to Embodiment 2; and FIG. 9B is a perspective view showing an external appearance shape of the fuel cartridge 1 according to Embodiment 2.

A fuel supply valve 3 provided at a fuel supply port 4 can move in a vertical direction on the drawing surface of FIG. 6B. A compression coil spring 6 biases the fuel supply valve 3 in an upward direction on the drawing surface of FIG. 6B. A fuel supply port 4 and a fuel storage container 2 are connected to each other through a fuel passage 7. These configurations are the same as those in Embodiment 1, so that the detailed description thereof will be omitted.

An opening 11 is provided on an upper surface of the fuel cartridge 1. A door 10 is guided by an arc-shaped rail 39, and rotates by about 45° around a shaft 30 to open/close the opening 11. When the opening 11 is opened, the fuel supply port 4 is exposed in the opening 11. A tension spring 32 applies a biasing force to the door 10 so that the closed state of the door 10 is maintained. One end of the tension spring 32 is fixed to an inner wall surface of the fuel cartridge 1, and the other end thereof is connected to the door 10. A first bevel gear 31 with a shaft 34 orthogonal to the shaft 30 being a rotation axis and a second bevel gear 33 with the shaft 30 being a rotation axis are provided so as to be engaged with each other. A roller 35 is integrated with the shaft 34. A first groove 36 is provided on a side surface of the fuel cartridge 1 in parallel with the direction in which the fuel cartridge 1 is inserted in the insertion port 90. A side surface opening 37 is provided on a bottom surface of the first groove 36, and the roller 35 is exposed in the side surface opening 37.

A slide member 40 is held by the fuel cartridge 1 so as to be able to move in parallel with the direction in which the fuel cartridge 1 is inserted in the insertion port 90. The slide member 40 is guided by a linear rail 43. A compression coil spring 41 biases the slide member 40 to an upper surface side (upper side on the drawing surface of FIG. 6B) of the fuel cartridge 1. A second groove 42 is provided on a side surface of the fuel cartridge 1 in parallel with the direction in which the fuel cartridge 1 is inserted in the insertion port 90. The bottom surface of the second groove 42 is opened, and an operation end 40b of the slide member 40 is exposed in the opening. When the slide member 40 receives only the biasing force of the compression coil spring 41, a lock hook 40a at one end of the slide member 40 protrudes in a movement path of the door 10. In this state, the door 10 is locked with the lock hook 40a of the slide member 40 so as not to turn. More specifically, the slide member 40 functions as a lock mechanism of the door 10.

A fuel intake 91 protrudes from an inner upper wall surface of the insertion port 90. A protrusion 92b for canceling a lock and having elasticity is provided so as to protrude to an inner side surface of the insertion port 90. A ridge-shaped convex portion 93b is provided on an inner side surface of the insertion port 90.

Next, an opening operation of the door 10 of the fuel cartridge 1 of Embodiment 2 configured as above will be described.

Figure 7A:
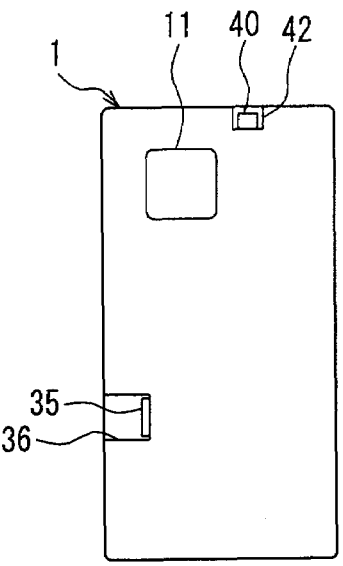
FIG. 7A is a plan view of the fuel cartridge according to Embodiment 2 of the present invention, which has been inserted in the fuel cartridge insertion port to cancel a lock.

As shown in FIGS. 6B and 6C, the fuel cartridge 1 is inserted in the insertion port 90. In the process of insertion, the protrusion 92b formed on an inner wall surface of the insertion port 90 comes into contact with and presses the operation end 40b of the slide member 40 provided in the fuel cartridge 1. This moves the slide member 40 in a downward direction against the biasing force of the compression coil spring 41 in FIG. 6B. Consequently, the lock hook 40a retracts out from the movement path of the door 10, and the lock of the door 40 is cancelled (FIGS. 7A and 7B).

Figure 7B:
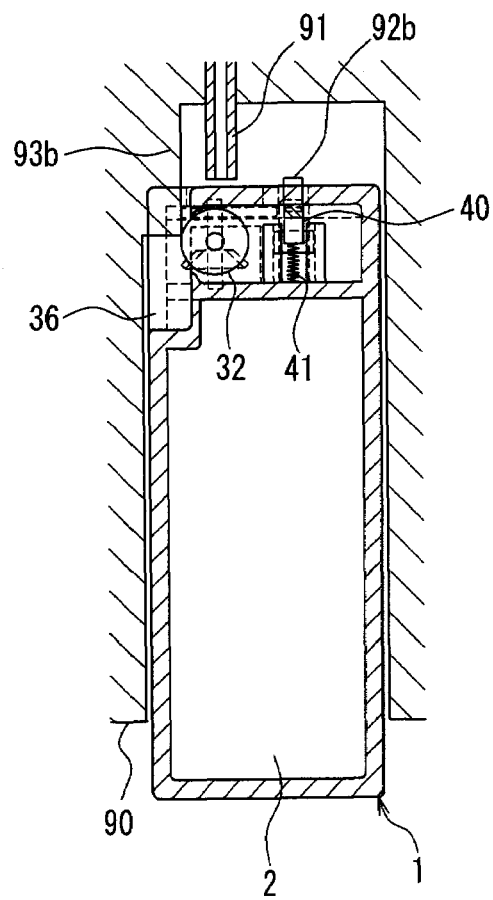
FIG. 7B is a side cross-sectional view showing a state in which the fuel cartridge according to Embodiment 2 of the present invention has been inserted in the fuel cartridge insertion port to cancel a lock.

When the fuel cartridge 1 is inserted further under the condition that the protrusion 92b is in contact with the operation end 40b of the slide member 40, as shown in FIG. 7B, the ridge-shaped convex portion 93b provided on the inner wall surface of the insertion port 90 moves in the first groove 36 on the side surface of the fuel cartridge 1, and a top surface of the ridge-shaped convex portion 93b comes into contact with the roller 35 protruding from the bottom surface of the first groove 36, thereby rotating the roller 35. The rotation of the roller 35 rotates the shaft 30 via the first bevel gear 31 and the second bevel gear 33. Thus, the door 10 integrated with the shaft 30 turns while extending the tension spring 32. More specifically, the ridge-shaped convex portion 93b, the roller 35, the shaft 34, the first bevel gear 31, the second bevel gear 33, and the shaft 30 convert the displacement of the fuel cartridge 1 in the insertion direction into the rotation movement of the door 10 in a plane orthogonal to the insertion direction. Along with the turn of the door 10, the opening 11 is opened, as shown in FIG. 8A.

After the door 10 starts turning, the slide member 40 reaches a bottom dead point in a movable range thereof, and the protrusion 92b is deformed elastically. Finally, the protrusion 92b crosses over the operation end 40b of the slide member 40, whereby the engagement state therebetween is cancelled. The slide member 40 is pushed immediately in an upward direction in FIG. 7B with an elastic restoring force of the compression coil spring 41, and collides with the lower surface of the door 10. After this, the door 10 continues to turn with the slide member 40 pressed to the lower surface of the door 10.

When the fuel cartridge 1 is inserted further, the fuel intake 91 protruding from the inner wall surface of the insertion port 90 is inserted in the opening 11 of the fuel cartridge 1, and further, is inserted in the fuel supply port 4 exposed in the opening 11. The fuel supply port 4 is composed of the fuel supply valve 3, the compression coil spring 6, an O-ring, and the like. The fuel intake 91 pushes in the fuel supply valve 3 in the fuel supply port 4, and the fuel passage 7 connected to a side wall surface along which the fuel supply valve 3 slides and the fuel supply port 4 are communicated with each other.

Figure 8A:
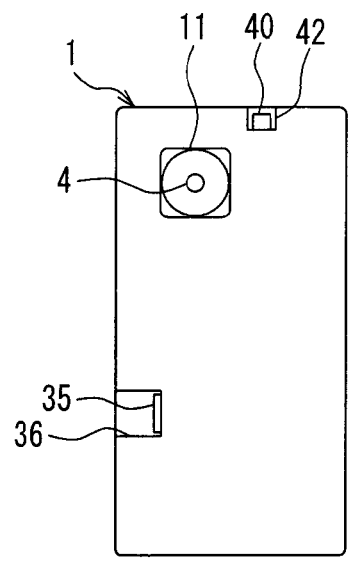
FIG. 8A is a plan view of the fuel cartridge according to Embodiment 2 of the present invention, which has been inserted to an end of the fuel cartridge insertion port to open a door completely.
Figure 8B:
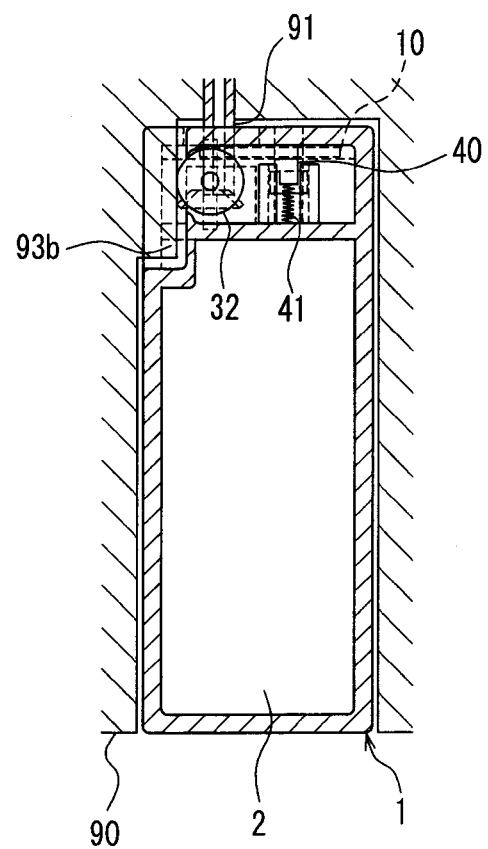
FIG. 8B is a side cross-sectional view showing a state in which the fuel cartridge according to Embodiment 2 of the present invention has been inserted to the end of the fuel cartridge insertion port to open the door completely.

When the fuel cartridge 1 has been inserted completely in the insertion port 90, the fuel in the fuel storage container 2 of the fuel cartridge 1 can be supplied to a fuel cell via the fuel passage 7, the fuel supply port 4, and the fuel intake 91 (FIGS. 8A and 8B).

In the case of pulling out the fuel cartridge 1 from the insertion port 90, the above-mentioned operation is performed in an opposite manner. More specifically, the fuel intake 91 is pulled out from the opening 11, and the fuel supply valve 3 is returned by an elastic restoring force of the compression coil spring 6 to close the fuel supply port 4. Then, the ridge-shaped convex portion 93b rotates the roller 35 in an opposite direction to the above, whereby the door 10 turns to close the opening 11 gradually. In this process, the protrusion 92b comes into contact with and crosses over the slide member 40. Finally, when the roller 35 and the ridge-shaped convex portion 93b are separated from each other, and the opening 11 is closed completely with an elastic restoring force of the tension spring 32, the slide member 40 is pushed up with an elastic restoring force of the compression coil spring 41, whereby the lock of the door 10 is set.

Thus, the fuel cartridge 1 of Embodiment 2 includes the door 10 covering the fuel supply port 4, and the slide member 40 as a lock mechanism preventing the door 10 from moving to open the opening 11 except when it is required. The fuel supply port protecting mechanism prevents the leakage of the stored fuel caused by the damage of the fuel supply port 4 or the opening of the fuel supply port 4 under the condition that the fuel cartridge 1 is not inserted in the insertion port 90.

As shown in FIG. 9A, the insertion port 90 may be provided with a door 100 for fixing the inserted fuel cartridge 1. After the fuel cartridge 1 is inserted, the fuel cartridge 1 is maintained in the insertion port 90 against the biasing force of the compression coil spring 6 and the tension spring 32 by closing the door 100. The fuel cartridge 1 can be taken out by opening the door 100.

Embodiments 1 and 2 as described above are merely representative embodiments of the present invention, and the present invention is not limited thereto.

For example, the mechanism for locking the movement of the door 10 may be, for example, a mechanism for inserting a lock pin in a hole provided in the door 10 or the like, other than the above-mentioned embodiment. Furthermore, the mechanism for locking the movement of the door 10 is not limited to the mechanical one, and may be a mechanism in which a lock operation and a lock cancel operation are performed with an electric signal.

Furthermore, as the configuration of the fuel supply port 4, in the above-mentioned embodiments 1 and 2, a valve mechanism is provided in which the fuel intake 91 pushes in the fuel supply valve 3 to make it possible to take out the fuel. Alternatively, for example, the following configuration may be provided: the fuel intake 91 on the fuel cell side is set to be a hollow needle shape, the fuel supply port 4 is set to be an elastic body, and the hollow needle pierces the elastic body to open a hole, whereby the fuel can be taken out, and when the cartridge is taken out, the hole of the elastic body is closed, and the sealed state is kept again.

Furthermore, there is no particular limit to the shape and the material for each mechanism, and each mechanism also can be controlled by transmitting/receiving a signal of equipment with a fuel cell mounted thereon.

Embodiment 3

In Embodiments 1 and 2, the fuel supply port protecting mechanism has been described, which limits the physical access to the fuel supply port 4 by the door 10 and the lock mechanism that locks an opening operation of the door 10. In Embodiment 3, a fuel supply port protecting mechanism for preventing unexpected leakage of a fuel by providing a plurality of valves in the fuel supply port 4 will be described.

Figure 10A:
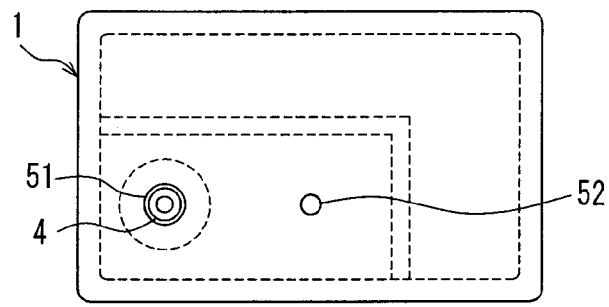
FIG. 10A is a plan view of a fuel cartridge according to Embodiment 3 of the present invention.
Figure 10B:
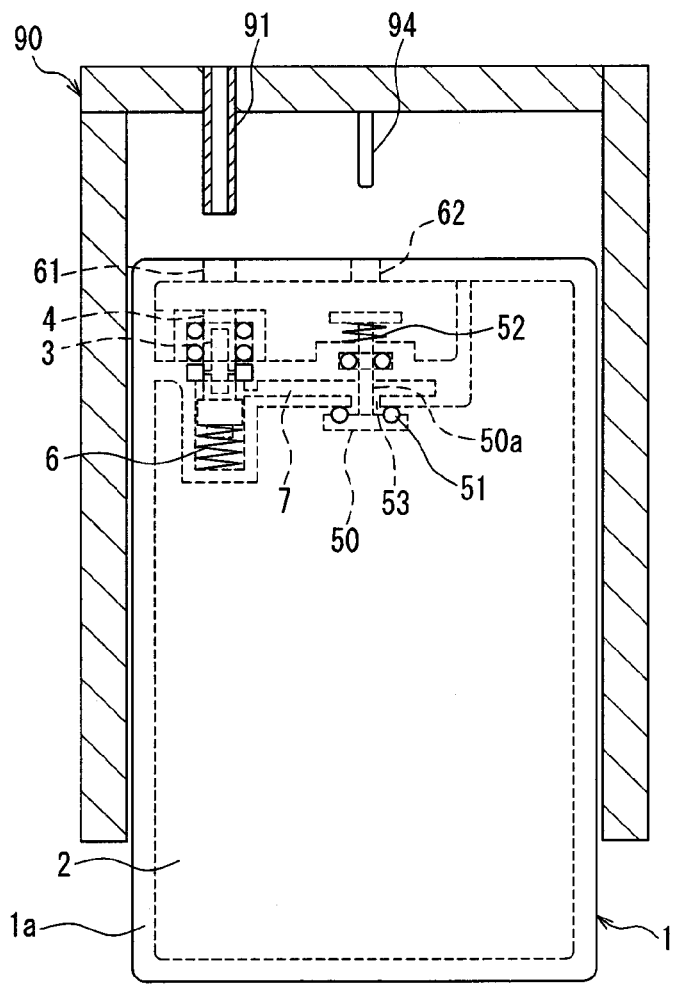
FIG. 10B is a front cross-sectional view showing one process in which the fuel cartridge according to Embodiment 3 of the present invention is inserted in a fuel cartridge insertion port.

FIG. 10A is a plan view of a fuel cartridge 1 according to Embodiment 3 of the present invention; and FIG. 10B is a front cross-sectional view showing one process in which the fuel cartridge 1 according to Embodiment 3 is inserted in an insertion port 90.

A fuel supply valve 3 provided at a fuel supply port 4 can move in a vertical direction on the drawing surface of FIG. 10B. A compression coil spring 6 biases the fuel supply valve 3 in an upward direction of the drawing surface of FIG. 10B. The fuel supply port 4 and a fuel storage container 2 are connected to each other through a fuel passage 7. These configurations are the same as those in Embodiment 1, so that the detailed description thereof will be omitted.

A second valve 50 is supported by a shaft 50a. A gap 53 connected to the fuel passage 7 is provided between the shaft 50a and a case 1a of the fuel cartridge 1. The second valve 50 is provided with an O-ring 51. The compression coil spring 52 applies a biasing force to the second valve 50. When the second valve 50 receives only the biasing force of the compression coil spring 52, the O-ring 51 is in contact with the case 1a.

A first opening 61 is provided at a position on the upper surface of the fuel cartridge 1, to which the fuel supply port 4 is opposed. A second opening 62 is provided at a position on the upper surface of the fuel cartridge 1, to which the second valve 50 is opposed.

A fuel intake 91 protrudes from an inner upper wall surface of an insertion port 90. A rod 94 protrudes from the inner upper wall surface of the insertion port 90. An outer diameter of the fuel intake 91 is substantially matched with an inner diameter of the first opening 61, and an outer diameter of the rod 94 is substantially matched with an inner diameter of the second opening 62.

Next, the operation of taking out a fuel of the fuel cartridge 1 of Embodiment 3 configured as above will be described.

As shown in FIG. 10B, the fuel cartridge 1 is inserted in the insertion port 90. In the process of insertion, the fuel intake 91 protruding from the inner wall surface of the insertion port 90 is inserted in the first opening 61, and the rod 94 is inserted in the second opening 62.

When the fuel cartridge 1 is inserted further, the fuel intake 91 is inserted in the fuel supply port 4 of the fuel cartridge 1. The fuel supply port 4 is composed of the fuel supply valve 3, the compression coil spring 6, an O-ring, and the like. The fuel intake 91 pushes in the fuel supply valve 3 in the fuel supply port 4, and the fuel passage 7 connected to a side wall surface along which the fuel supply valve 3 slides and the fuel supply port 4 are communicated with each other.

Substantially at the same time with the above, the rod 94 comes into contact with the second valve 50, and elastically compresses the compression coil spring 52 to push in the second valve 50. Consequently, the O-ring 51 leaves the case 1a of the fuel cartridge 1.

Figure 11:
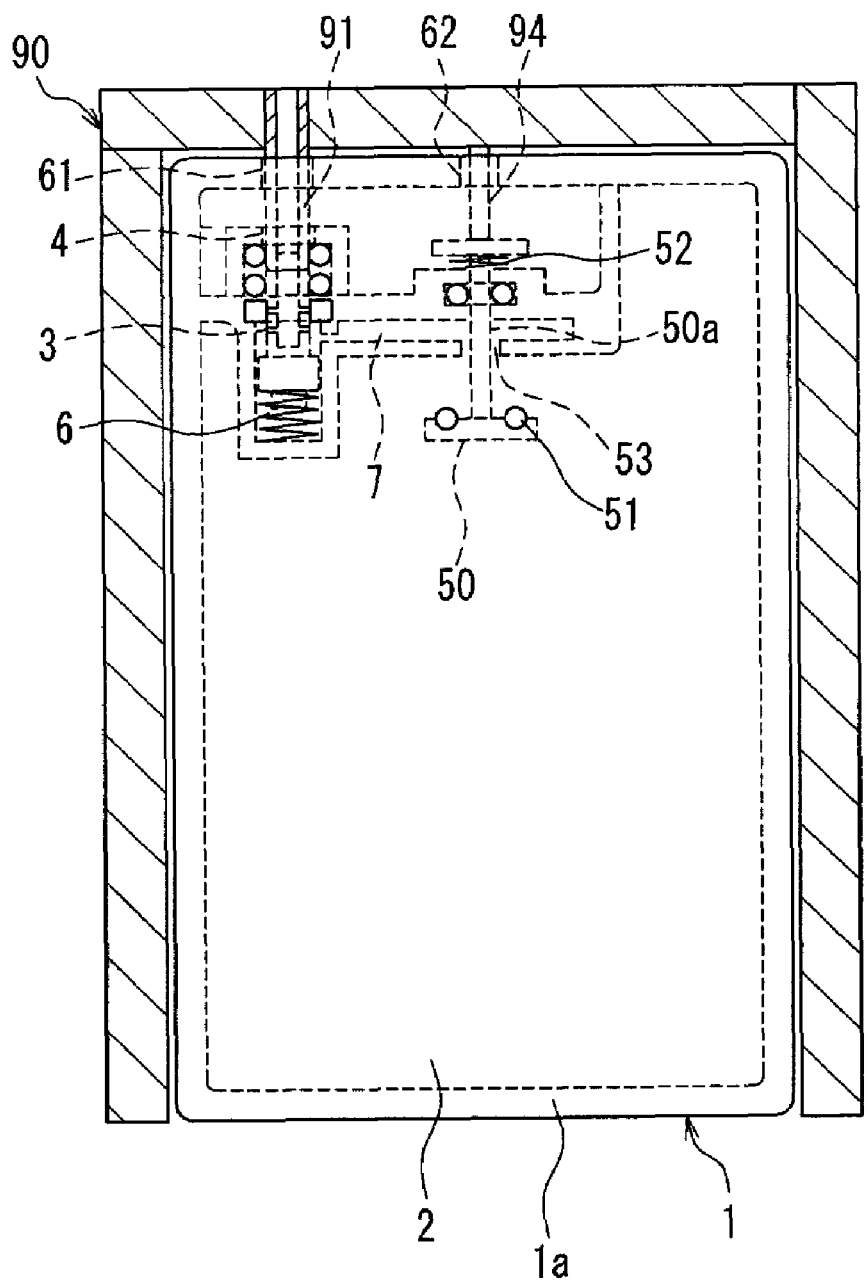
FIG. 11 is a front cross-sectional view showing a state in which the fuel cartridge according to Embodiment 3 of the present invention has been inserted to an end of the fuel cartridge insertion port.
Figure 12:
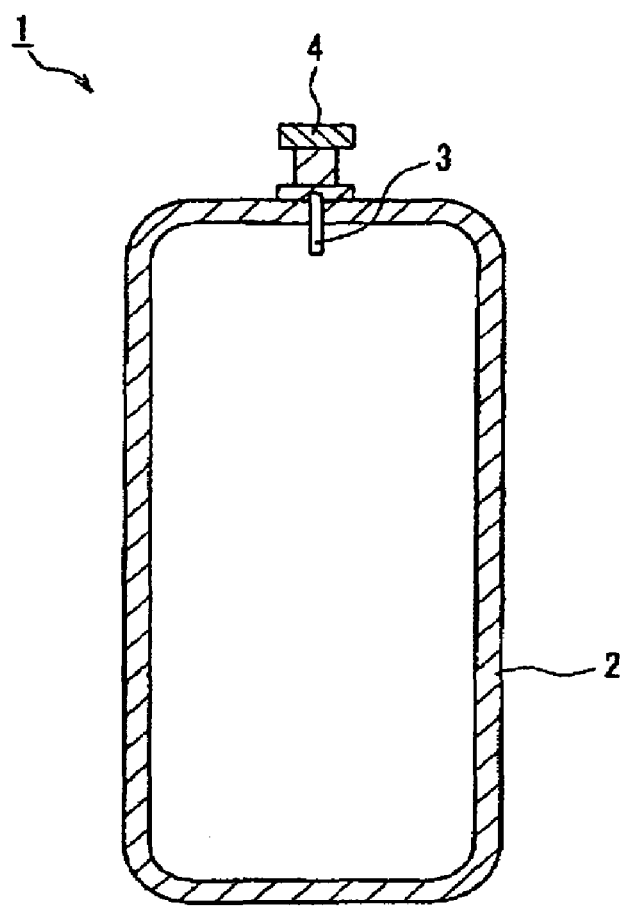
FIG. 12 is a cross-sectional view showing an example of a conventional fuel cartridge for a fuel cell.

When the fuel cartridge 1 has been inserted in the insertion port 90 completely, as shown in FIG. 11, the fuel in the fuel storage container 2 of the fuel cartridge 1 can be supplied to a fuel cell via the gap 53, the fuel passage 7, the fuel supply port 4, and the fuel intake 91.

In the case of pulling out the fuel cartridge 1 from the insertion port 90, the above-mentioned operation is performed in an opposite manner. More specifically, the fuel intake 91 is pulled out from the first opening 61, and the fuel supply valve 3 is returned by an elastic restoring force of the compression coil spring 6 to close the fuel supply port 4. Furthermore, the rod 94 is pulled out from the second opening 62, and the second valve 50 is returned by an elastic restoring force of the compression coil spring 52 to bring the O-ring 51 into contact with the case 1a.

Thus, in the fuel cartridge 1 of Embodiment 3, the fuel supply valve 3 and the second valve 50 are placed in series on the fuel passage 7 connecting the fuel storage container 2 to the fuel supply port 4. Due to the fuel supply port protecting mechanism, the fuel in the fuel storage container 2 cannot be taken out unless the two valves 3 and 50 are opened simultaneously. Thus, the leakage of the stored fuel caused by carelessness can be prevented.

As the inner diameter of the second opening 62 is smaller, the possibility for a user to operate the second valve 50 by mistake with the finger or the like can be reduced more. In one example, the inner diameter of the second opening 62 was set to be 1.5 mm. With this dimension, the second valve 50 cannot be pushed in to be opened unless a thin bar or the like is used. Furthermore, even when the second valve 50 is pushed down, the fuel in the fuel cartridge 1 does not leak unless the fuel supply valve 3 in the fuel supply port 4 is pushed in simultaneously. Therefore, the possibility of the leakage of a fuel is very low in ordinary handling.

In Embodiment 3, although two valves are placed in series on the fuel passage 7 connecting the fuel storage container 2 to the fuel supply port 4, three or more valves may be placed in series. Furthermore, although the example in which the valve is opened by the operation of pushing in the valve has been described, the valve may be opened by the operation such as the pulling, rotation, and horizontal movement of the valve.

Furthermore, the valve also can be driven with an electric signal or the like.

In the same way as described in Embodiments 1 and 2, the insertion port 90 may be provided with a door for fixing the inserted fuel cartridge 1. By closing the door after inserting the fuel cartridge 1, the fuel cartridge 1 is maintained in the insertion port 90 against the biasing force of the compression coil springs 6 and 52. The fuel cartridge 1 can be taken out by opening the door.

INDUSTRIAL APPLICABILITY

Although there is no particular limit to the applicable field of the present invention, the present invention can be used for a fuel cell mounted on mobile equipment or the like, for example. In particular, the present invention can be used preferably for a direct methanol type fuel cell.

The invention claimed is:

1. A fuel cartridge for a liquid fuel cell, comprising a liquid fuel used directly for generation of electric power in a liquid fuel cell, a fuel storage container storing the liquid fuel and a fuel supply port for taking out the liquid fuel from the fuel storage container, the fuel supply port being configured so as to seal the liquid fuel internally in the fuel storage container, wherein the fuel cartridge for a liquid fuel cell includes a fuel supply port protecting mechanism provided so as to cover the fuel supply port so as to protect the fuel supply port physically, and the fuel supply port protecting mechanism includes a door and a lock mechanism for locking the door so that the door does not open, an opening in which a driving portion is inserted, the driving portion being provided in an insertion port of the liquid fuel cell in which the fuel cartridge is inserted, and a film that closes the opening.

2. The fuel cartridge for a fuel cell according to claim 1, wherein physical access to the fuel supply port is not allowed unless a lock by the lock mechanism is cancelled and the door is opened.

3. The fuel cartridge for a fuel cell according to claim 1, wherein the fuel supply port protecting mechanism further includes a mechanism capable of confirming that a lock by the lock mechanism is cancelled.

4. A fuel cell comprising the fuel cartridge for a fuel cell of claim 1 and an insertion port in which the fuel cartridge is inserted, wherein the insertion port includes a lock cancel system for canceling a lock by the lock mechanism, and a driving portion for performing an opening operation of the door.

5. A fuel cartridge for a fuel cell, comprising a fuel storage container and a fuel supply port for taking out a fuel stored in the fuel storage container, wherein a fuel supply port protecting mechanism is provided at the fuel supply port, the fuel supply port protecting mechanism includes a least a first valve and a second valve provided in series on a fuel passage connecting the fuel storage container to the fuel supply port, at a case of the fuel cartridge, a first opening is provided between the first valve and an outside, and a second opening is provided between the second valve and the outside, and an opening operation of the first valve is performed via the first opening, and an opening operation of the second valve is performed via the second opening.

6. A fuel cell comprising the fuel cartridge for a fuel cell of claim 5 and an insertion port in which the fuel cartridge is inserted, wherein the insertion port includes a first driving portion and a second driving portion for opening the first and second valves simultaneously.

\* \* \* \* \*